May 15, 1928. 1,669,802
C. C. ARMSTRONG
ELECTRIC STOVE
Filed Aug. 3, 1925 15 Sheets-Sheet 1

Inventor:
Charles C. Armstrong,
by Spear, Middleton, Donaldson & Hall
Attys.

May 15, 1928.

C. C. ARMSTRONG

ELECTRIC STOVE

Filed Aug. 3, 1925   15 Sheets-Sheet 4

1,669,802

Inventor:
Charles C. Armstrong,
by Spear, Middleton, Donaldson & Hull
Attys.

May 15, 1928.
C. C. ARMSTRONG
ELECTRIC STOVE
Filed Aug. 3, 1925
1,669,802
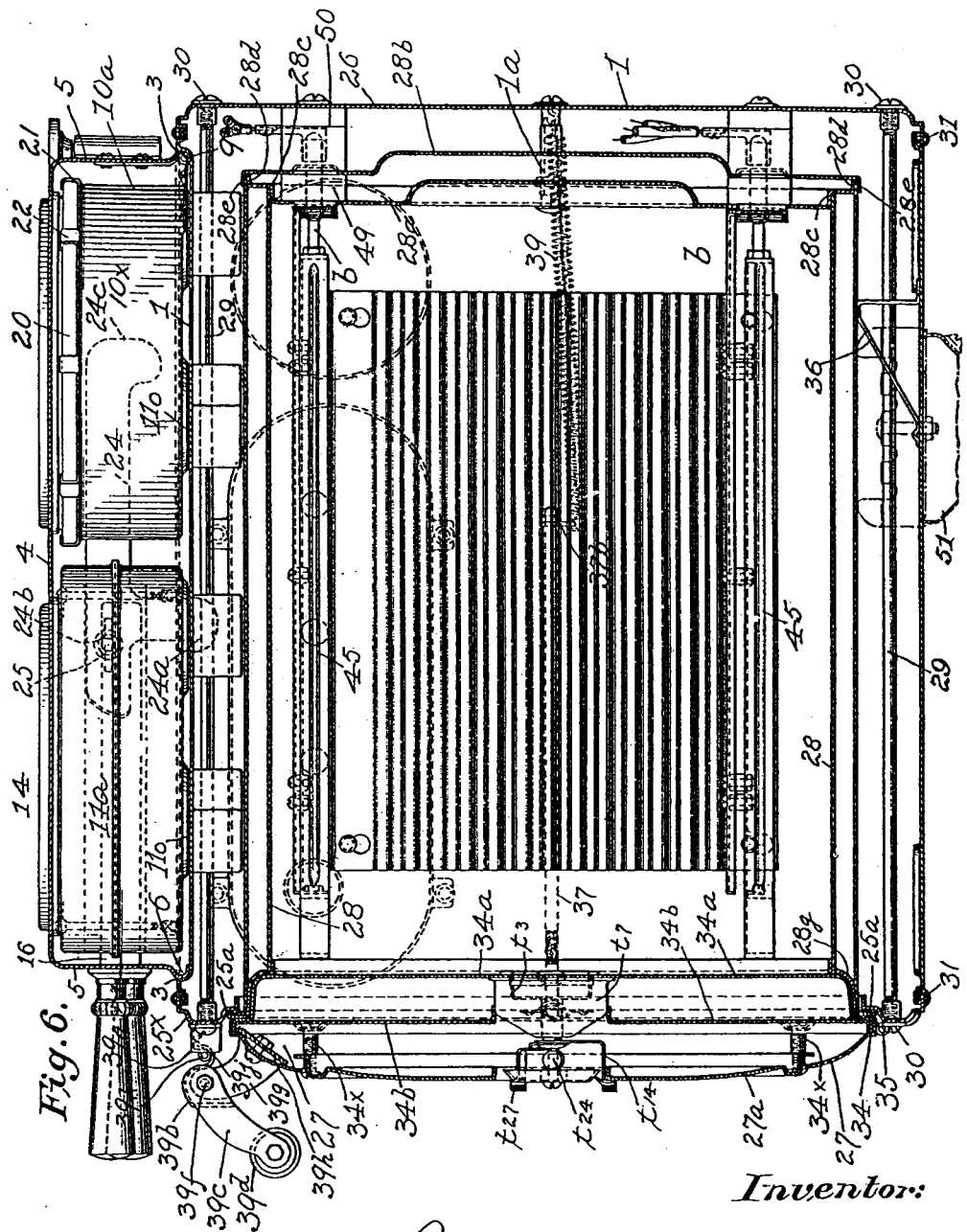
Inventor:
Charles C. Armstrong,

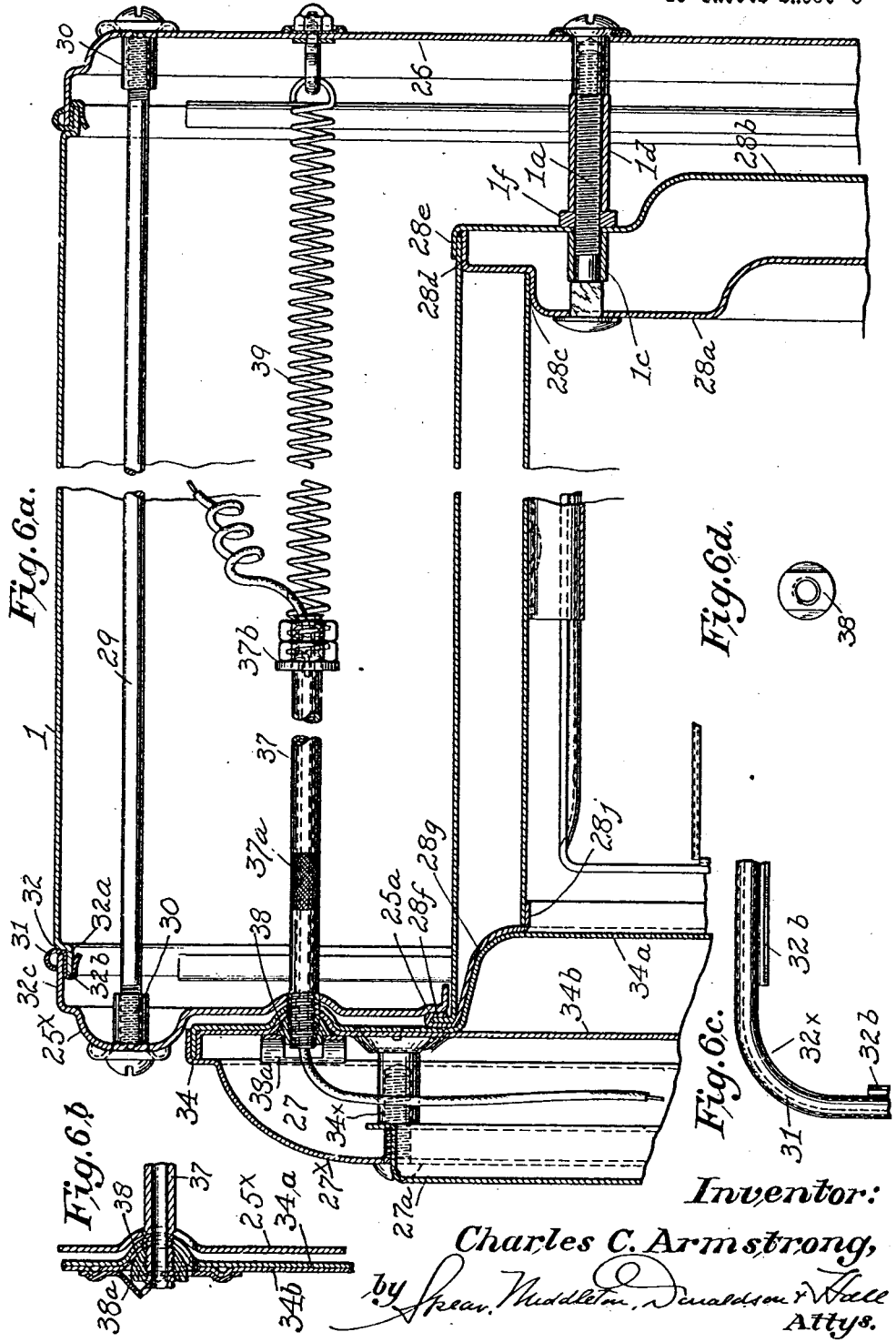

May 15, 1928.   C. C. ARMSTRONG   1,669,802
ELECTRIC STOVE
Filed Aug. 3, 1925   15 Sheets-Sheet 7

Inventor:
Charles C. Armstrong,
by Spear, Middleton, Donaldson & Hull
Attys.

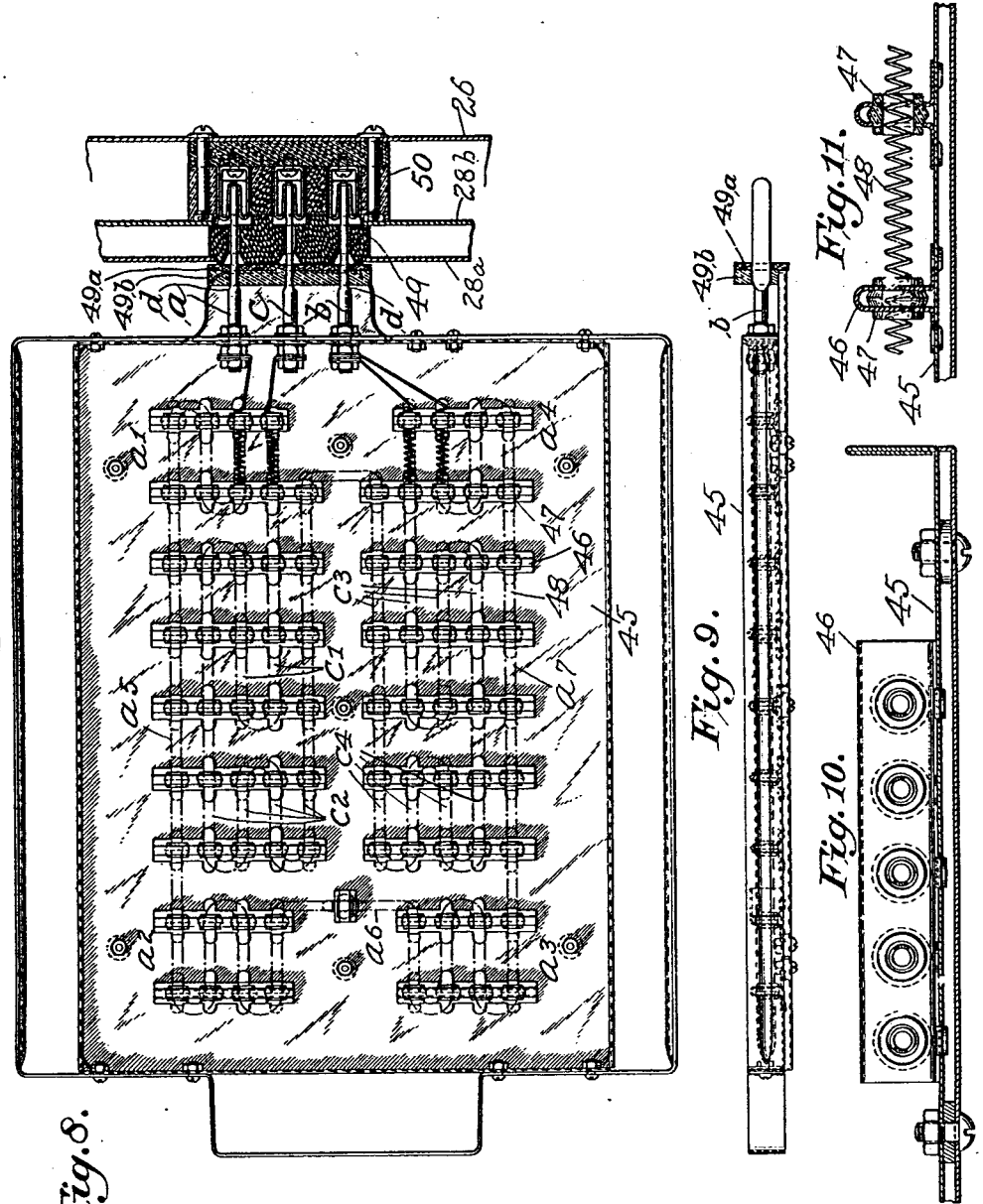

May 15, 1928.
C. C. ARMSTRONG
1,669,802
ELECTRIC STOVE
Filed Aug. 3, 1925 15-Sheets-Sheet 9
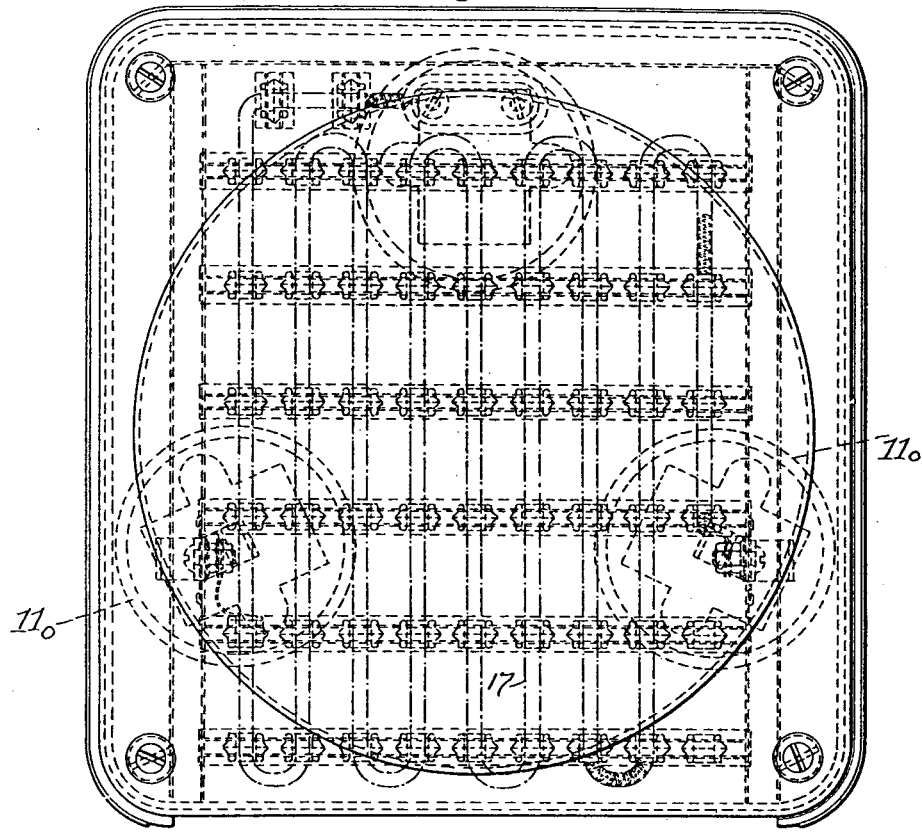
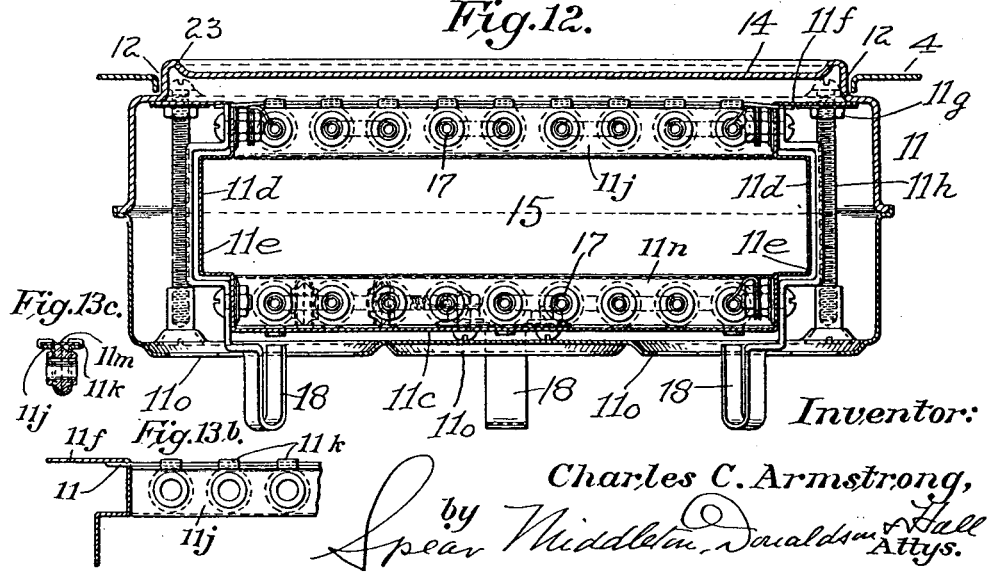
Inventor:
Charles C. Armstrong,
by Spear, Middleton, Donaldson and Hall
Attys.

May 15, 1928.

C. C. ARMSTRONG

ELECTRIC STOVE

Filed Aug. 3, 1925 15 Sheets-Sheet 10

Inventor:
Charles C. Armstrong,
by Spear, Middleton, Donaldson & Hall
Attys.

May 15, 1928. 1,669,802
C. C. ARMSTRONG
ELECTRIC STOVE
Filed Aug. 3, 1925 15 Sheets-Sheet 11
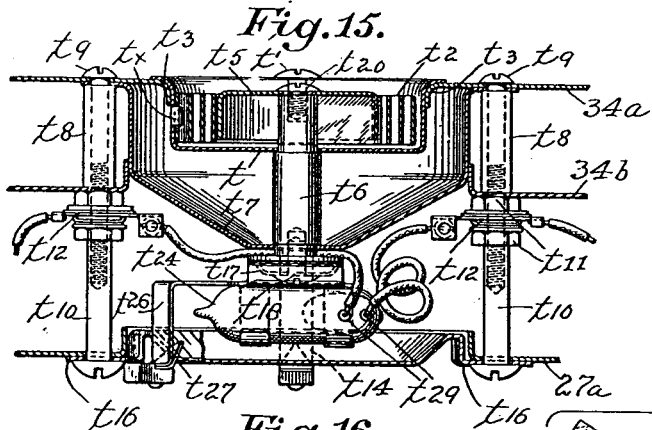
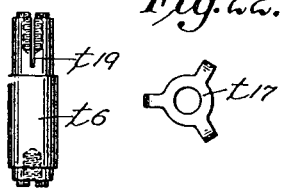
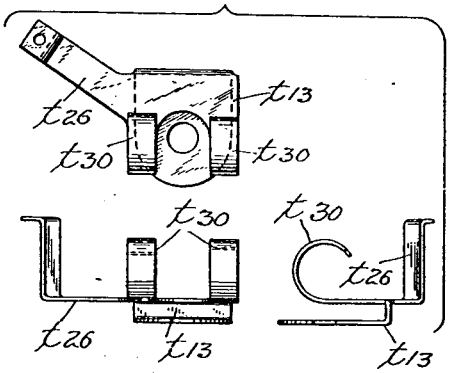
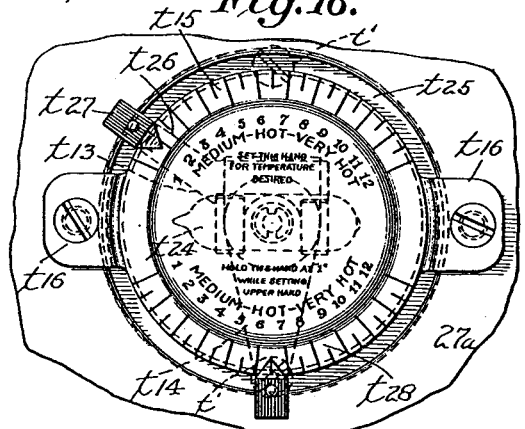
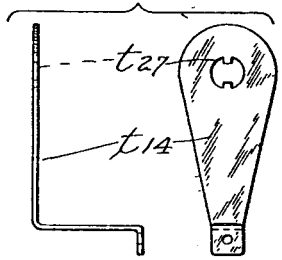
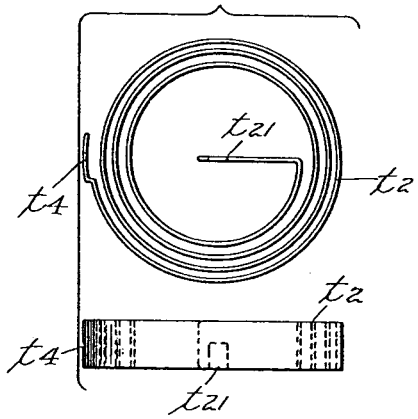
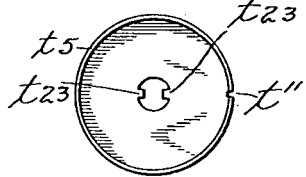
Inventor:
Charles C. Armstrong, May 15, 1928.  1,669,802
C. C. ARMSTRONG
ELECTRIC STOVE
Filed Aug. 3, 1925  15 Sheets-Sheet 12
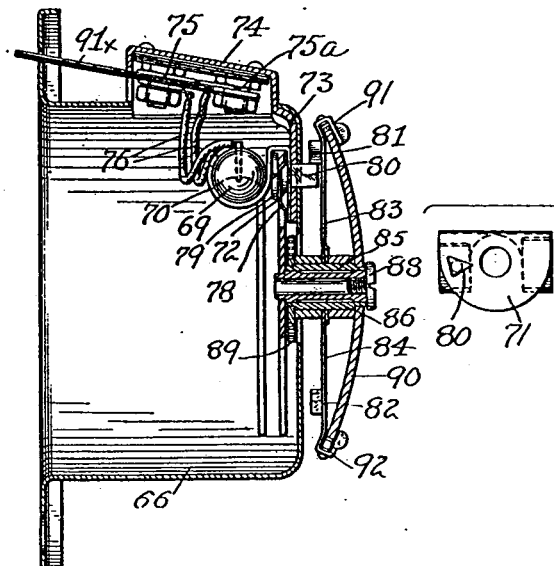
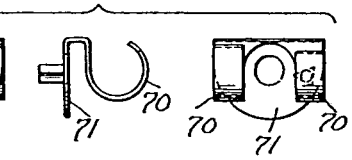
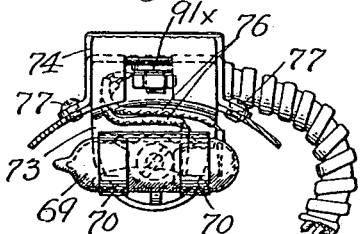
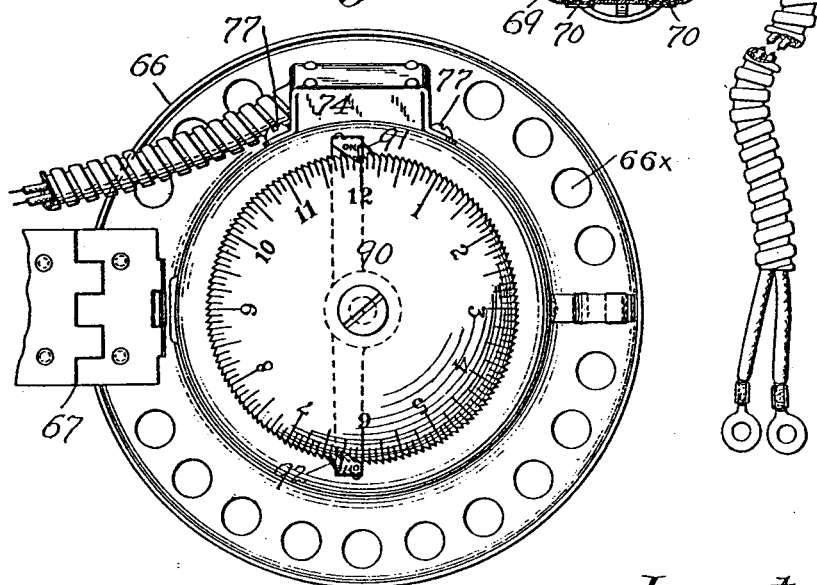
Inventor:
Charles C. Armstrong,
by Spear, Middleton, Donaldson + Hall
Attys.

May 15, 1928.  1,669,802
C. C. ARMSTRONG
ELECTRIC STOVE
Filed Aug. 3, 1925   15 Sheets-Sheet 13
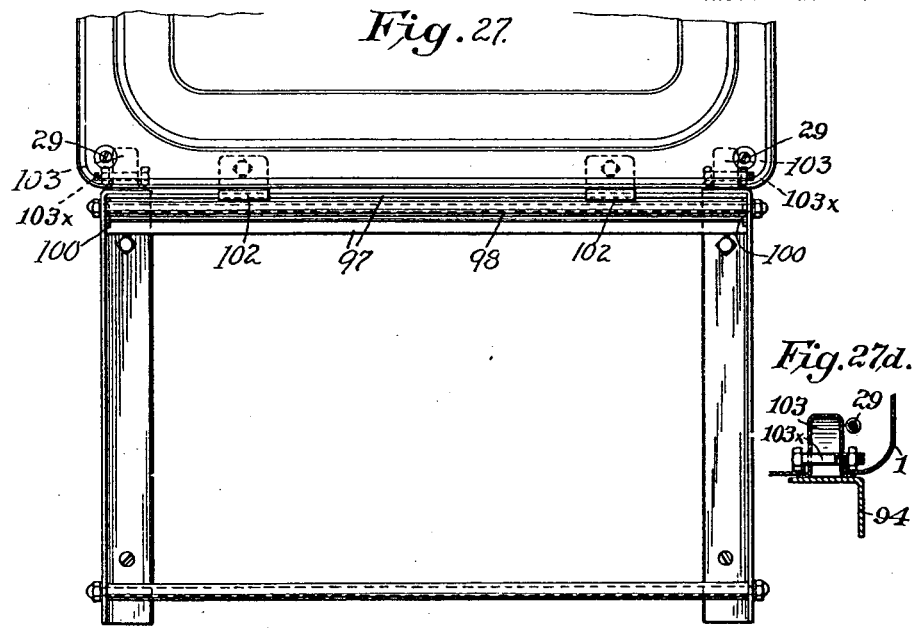
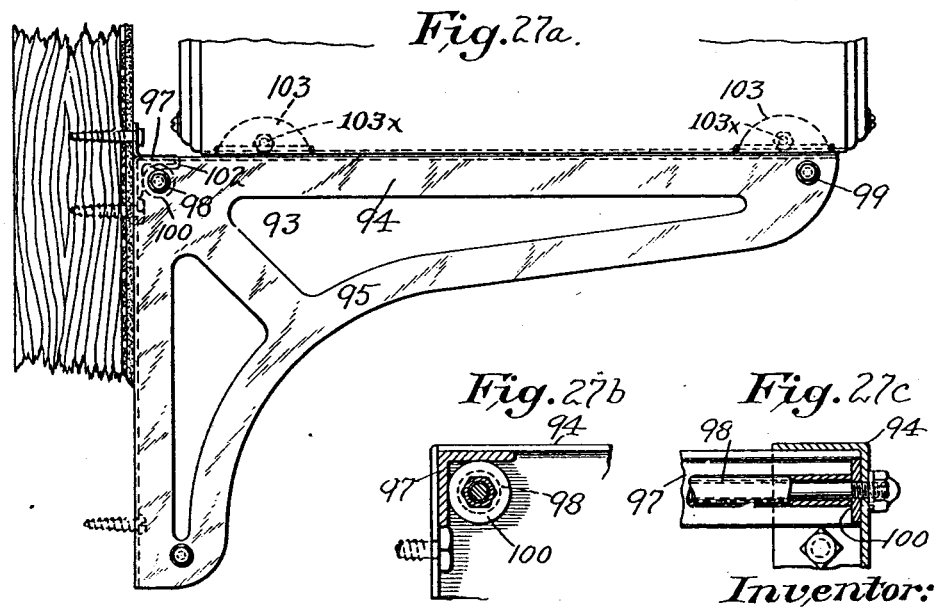
Inventor:
Charles C. Armstrong, May 15, 1928.
C. C. ARMSTRONG
ELECTRIC STOVE
Filed Aug. 3, 1925    15 Sheets-Sheet 14
1,669,802
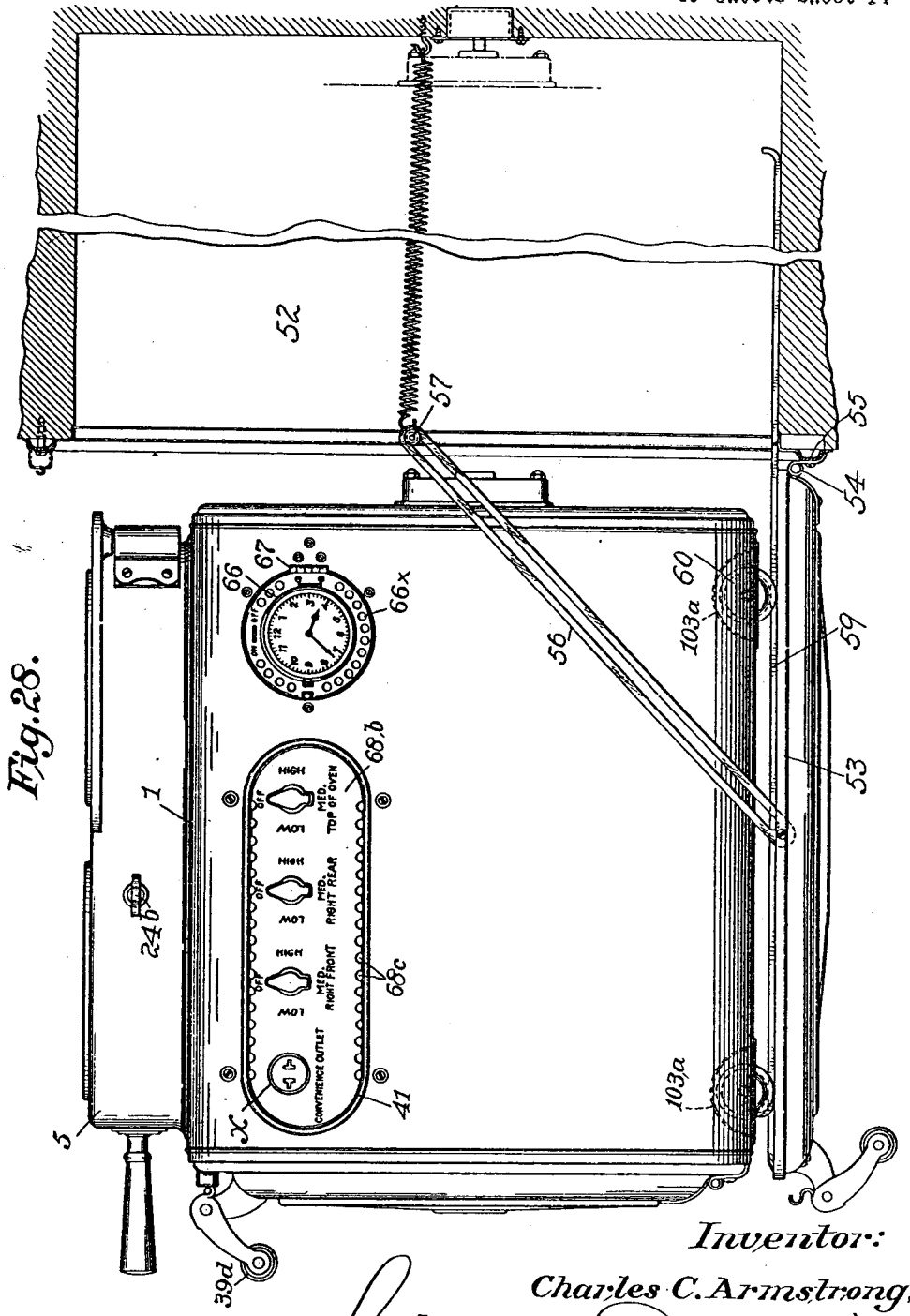

May 15, 1928.

C. C. ARMSTRONG

ELECTRIC STOVE

Filed Aug. 3, 1925

Inventor:
Charles C. Armstrong,
by Spear, Middleton, ... & Hall
Attys.

Patented May 15, 1928.

1,669,802

UNITED STATES PATENT OFFICE.

CHARLES C. ARMSTRONG, OF HUNTINGTON, WEST VIRGINIA.

ELECTRIC STOVE.

Application filed August 3, 1925. Serial No. 47,830.

The invention concerns the general construction of the stove and special features and details of construction and organization in connection with the main features. The stove is of parallelepipedon or box like form and contains within its limits all of the cooking appliances provided in stoves built along the general line of a gas range, but instead of being provided with a platform at a point off laterally to one side of the oven in which platform the burners are located, in my organization the platform in which burners are positioned surmounts the oven so that no more space laterally is necessary for the occupancy of the stove than that which is required to accommodate the main body portion in which the oven is located, permitting better heat insulating means and in connection with the cover, ease in cleaning and servicing.

The stove besides having four heating elements or burners in its top which represent the capacity of the ordinary gas stove and of certain other forms of electric stoves and besides having an oven is provided with a toasting appliance and also with provision for the use of a waffle iron, the top surfaces of the front elements being usable as griddles or hot plates.

The invention consists of the features and combination and arrangement of parts hereinafter described and particularly pointed out in the claims.

In the accompanying drawing

Figure 5:
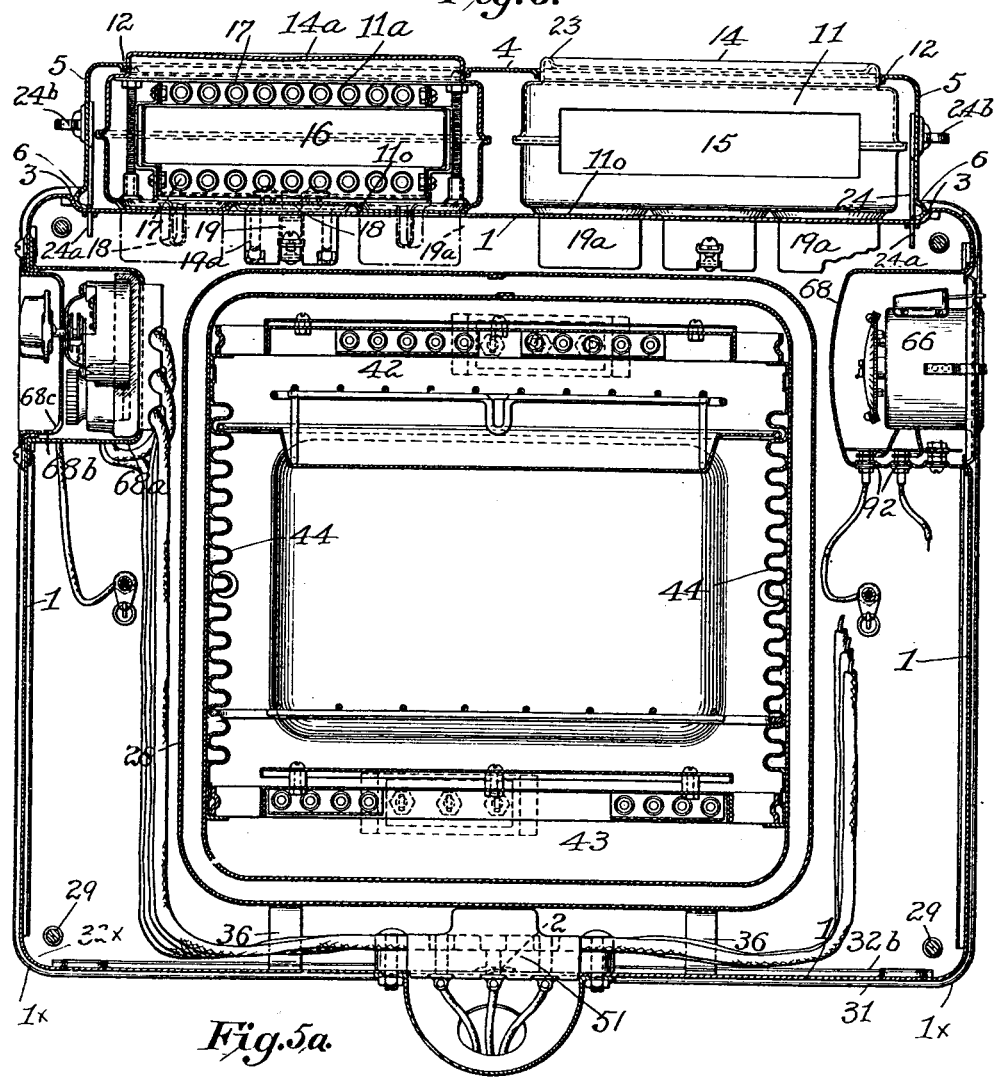
Fig. 5 is a vertical transverse section through the stove in a plane near the front thereof at the point where the waffle iron attachment and the toasting attachment is located, with certain parts shown in elevation.
Figure 5A:
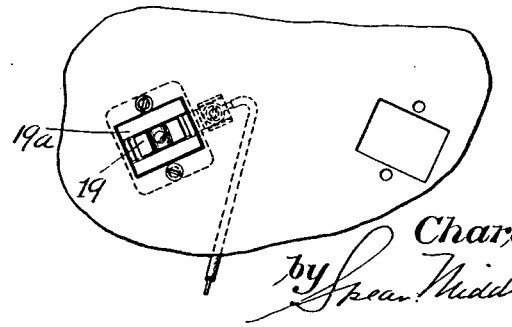

Fig. 5ª is a plan view of part of the top of the main body.

Fig. 6 is a central vertical section from front to rear of the stove with certain parts shown in side elevation.

Fig. 6ª is a detail view of a horizontal section through the body, door and oven.

Figs. 6ᵇ, 6ᶜ and 6ᵈ are details.

Figure 7:
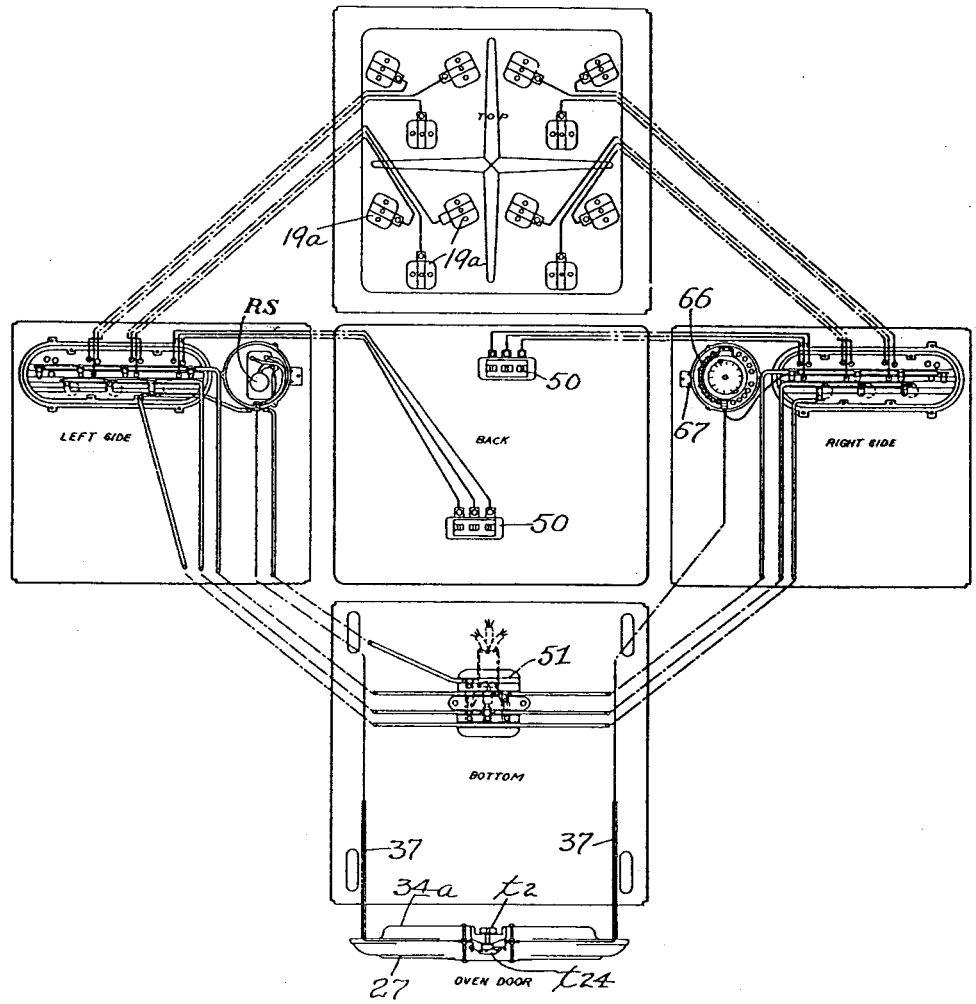

Fig. 7 is a diagrammatic view of the electrical connections, switches, and the clock and thermostat appliances.

Fig. 8 is a plan view of one of the heating elements for the oven.

Fig. 9 is a side elevation of Fig. 8.

Fig. 10 is a front view of a portion of the heating element of Fig. 8.

Fig. 11 is a detail relating to the heating element of Fig. 8.

Fig. 12 is a view of one of the front heating units.

Figure 13A:
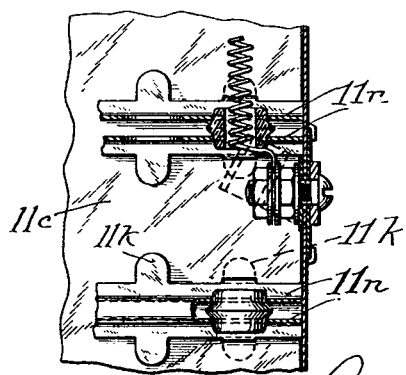

Fig. 13 is a plan view of the heating unit of Fig. 12.

Figs. 13ª, 13ᵇ and 13ᶜ are details of Figs. 12 and 13.

Figure 14:
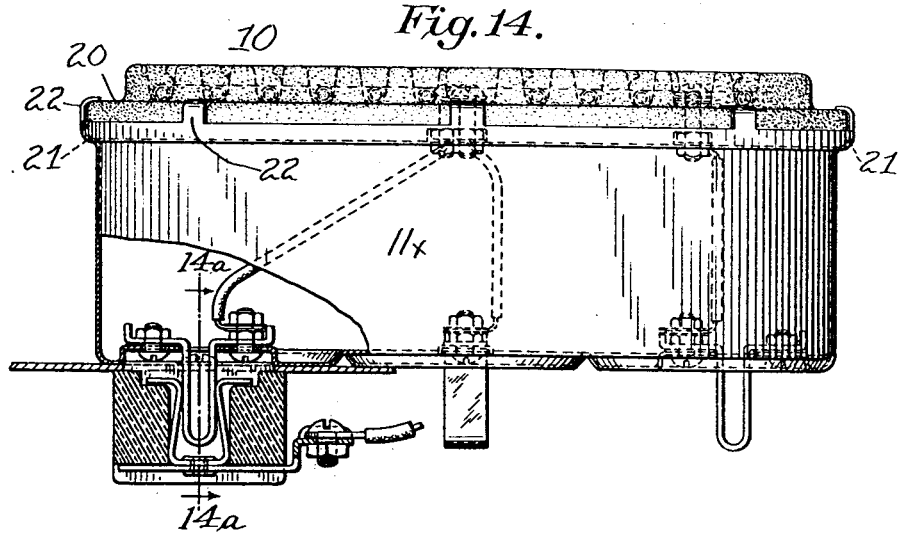
Figure 14A:
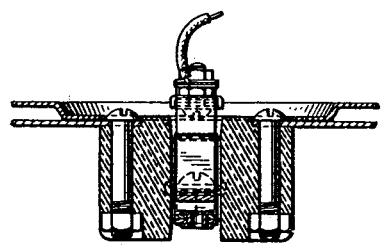
Figure 14B:
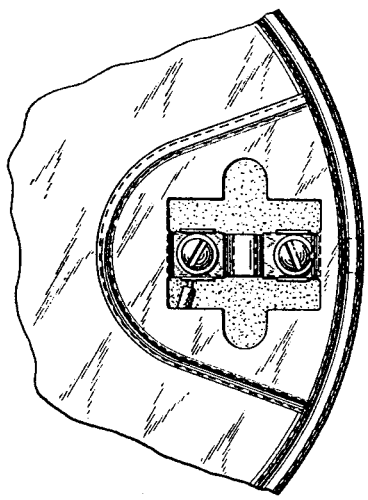

Fig. 14 is a view of one of the rear heating units.

Figs. 14ª and 14ᵇ are details of Fig. 14.

Fig. 15 is a horizontal section through a portion of the oven door, with the thermostatic circuit control means.

Fig. 16 is a face view of parts of Fig. 15.

Fig. 17 is a view of the shaft of the thermostat.

Fig. 18 shows views of the mercury tube holder.

Fig. 19 is a view of an indicator.

Fig. 20 is a detail.

Fig. 21 is a view of the thermostat coil.

Fig. 22 is a detail.

Fig. 23 is a view of a time control element.

Fig. 24 is a sectional view of the time control mechanism.

Fig. 25 is a rear view thereof.

Fig. 26 shows details of the mercury tube holder relating to the time control means.

Fig. 27 shows the supporting bracket for the stove.

Figs. 27ª, 27ᵇ and 27ᶜ and 27ᵈ are details of Fig. 27.

Fig. 28 is a side elevation of another form of stove and the manner of supporting the same to be moved into and out of a recess in the wall of the room.

Figure 29:
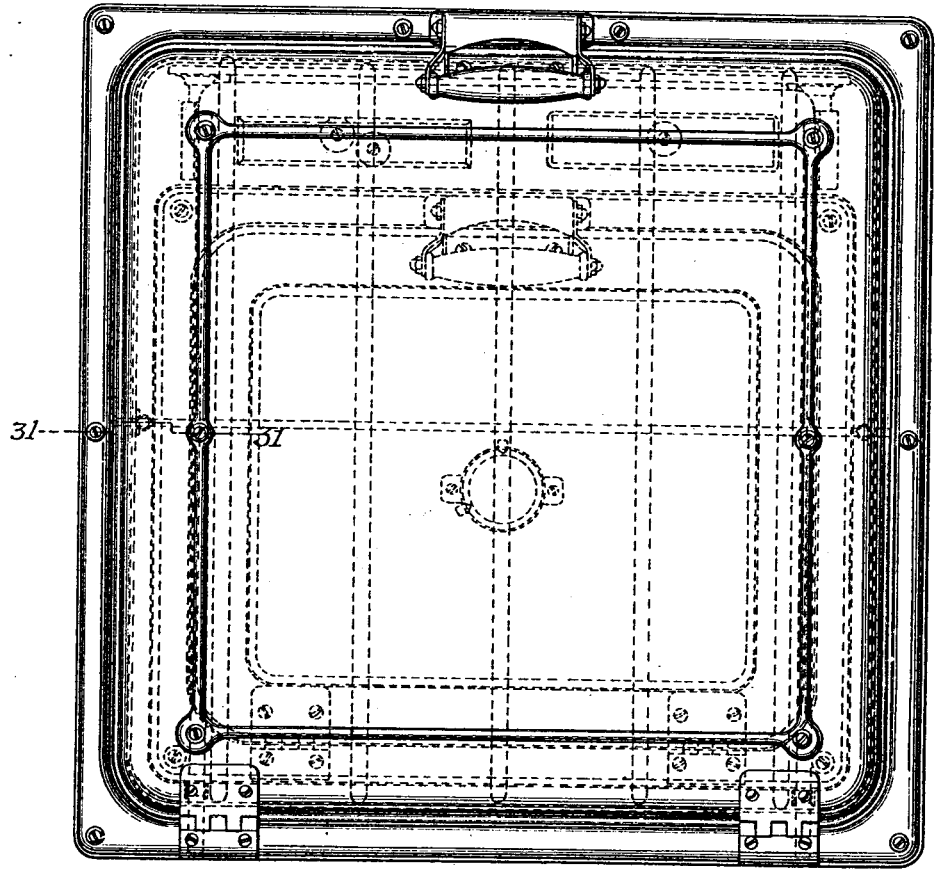

Fig. 29 is a front view of the stove of Fig. 28.

Figure 30:
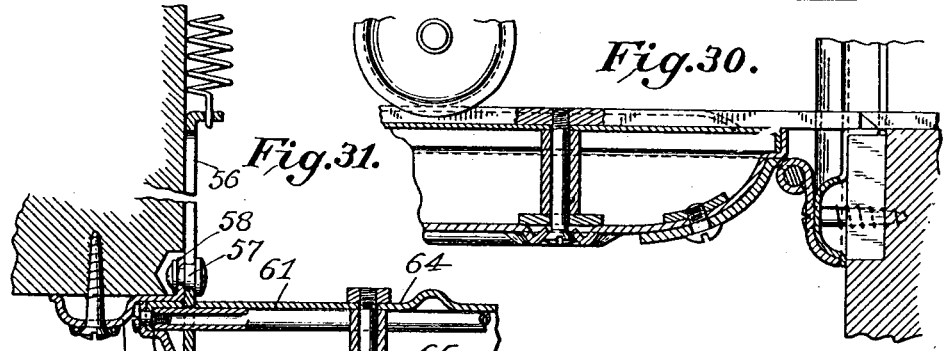
Figure 31:
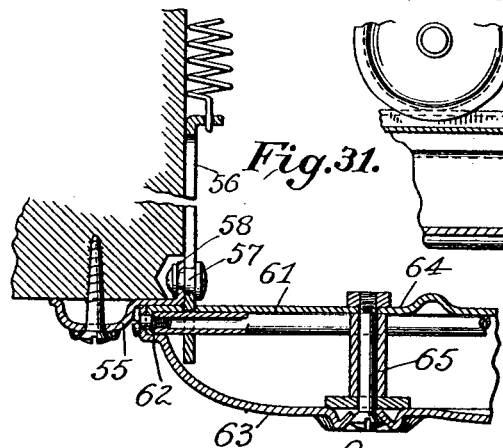

Figs. 30 and 31 are sectional views showing details.

The oven has full automatic control, that is to say, it will start up automatically at a time which may be set by the cook or housekeeper, by the clock attachment on the stove, and it will regulate the temperature to the degree of heat desired to cook fast or slow as the cook desires, and it will shut off the current at the prescribed time to stop the cooking, this being done automatically and according to the setting of the control by the cook.

The main body 1 of the stove is made up of sheet metal, of one piece, stamped to the substantially rectangular form shown in Figs. 5 and 6.

It has but one joint as shown at 2, which may be completed by welding or in any suitable way. The top portion of this main body is countersunk as at 3 to provide a slightly depressed top plate for receiving certain of the heating elements to be supported thereby and for supporting also a cover section composed of a top plate 4 and depending front, rear and lateral side portions 5 which have their lower edges beaded as at 6 to rest with their rounded surfaces upon the corresponding curved margins 3 defining the countersink or depression of the upper wall of the main body of the stove. This cover member is hinged to the main body of the stove at its rear edge 9 so that it may be swung up to expose the upper heating units or elements indicated generally at 10, 10ª, 11, 11ª, located within the chamber or compartment formed between the said cover 4 and the top plate or portion of the main body 1. The cover plate has openings as at 12, Fig. 5 through which the heating elements are exposed on which utensils are placed to be heated.

There are four of these openings in the form of the invention chosen for illustration, and those at the rear are for the open heating elements which have clay members in grooves of which the heating coils are placed, and from which the heat is directed upwardly against the bottom of the cooking vessels. The two front openings receive plates 14, 14ª of the heating units instead of grates. The plate at the right has a depressed surface and the plate at the left is plain, and both can be used as griddles or serve as heating plates for the vessel placed thereon.

Figure 1:
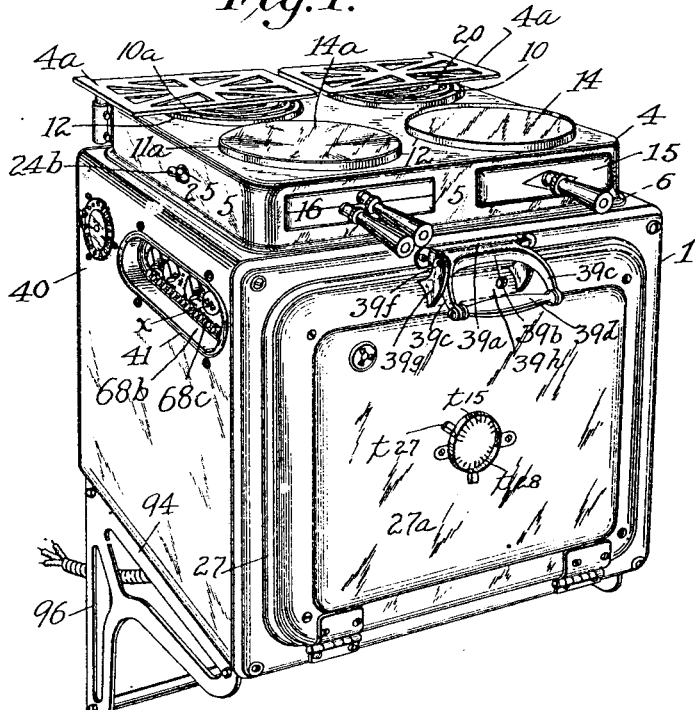
Figure 1 is a perspective view of one form of the stove looking from the front and left side.
Figure 2:
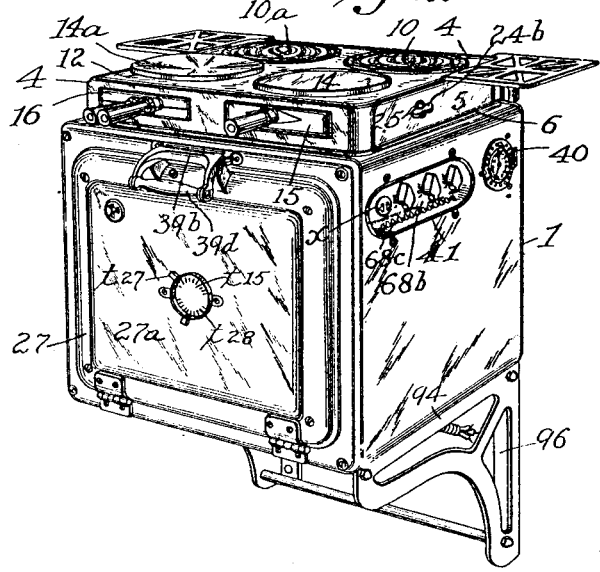
Fig. 2 is a view of the stove of Fig. 1 looking from the right side.

The front wall of the cover member is provided with openings for the insertion or removal of waffle irons and a toaster, into and away from the front heating units, the toaster being located at the right hand heating unit, and the waffle iron being used at the left hand heating unit as shown respectively at 15, 16, Figs. 1, 2 and 5.

The heating units at the front marked 11 and 11ª are of an enclosed type in that they do not direct heat up immediately against the vessel as do the rear heating units above mentioned, and it will be seen from Fig. 5 showing one of these front heating units in section that the plates 14, 14ª above mentioned are provided by the upper extensions of the casings of these forward heating units which extensions project upwardly through the openings in the top of the cover member in which they closely fit and form closures therefor against air circulation.

This feature of the top of the heating unit acting as a closure for the opening in the cover 4 is present at all the heating units to provide for the dead air space within the said cover 4.

The front heating units comprise an enclosing casing which may be made of upper and lower sections secured together, the bottom of the casing resting on the top plate or portion of the main body 1. These casings are of rectangular form at their main body portions and the circular plate portions 14, 14ª form extensions of the upper section of the main body. The main body at the front is provided with an opening to match the opening in the front wall of the cover member for the placing or removal of the toaster and waffle irons. Within the casing of the heating units 11, 11ª heating or resistance coils 17 are located supplied with current through suitable circuit connections, and there are two series of these coils between which the waffle irons and toaster are received. Each of these heating units is provided with spring contacts as at 18, which engage electric contacts mounted on the top plate of the main body 1, for which purpose spring members 19 are mounted in insulating blocks 19ª secured to the under side of the top plate 1 which is provided with an opening through which the spring contact members 19 are exposed to receive the depending spring contacts 18 of the heating elements. All the heating units or elements, i. e. both the front and rear sets are provided with these contacts to engage the companion socketed contacts of the top 1. The rear heating units 10, like those above described have jackets or casings as at 10ˣ but instead of being closed at the top by extending the sheet metal shell of the casing they hold the members shown at 20 consisting of plates of non-conducting material such as clay, spirally grooved on their upper surfaces, in which grooves the heating or resistance coils are placed.

The clay plate rests on a shoulder 21 at the upper part of the side wall of the casing of the heating element where it is retained by the clips forming extensions of said side wall as at 22. These rear heating units or elements like those above described are provided with depending electrical contacts which removably engage other contacts carried by the top plate 1 of the main body. All the heating units are protected against drafts and loss of heat by the movable cover 4 which encloses them.

This cover member 4 provides a dead air space in which the heating elements above described are located, and by which the heat is conserved, the dead air serving as a heat insulation. This feature is also carried out in connection with the heating elements themselves. For this purpose and referring now to the front rectangular heating elements 11, or 11ª, Figs. 5, 12 and 13, each is provided with an inner member composed of a bottom plate portion 11ᶜ and sides 11ᵈ which have guide ways 11ᵉ extending from front to rear of the member for receiving the waffle irons or the toaster. The sides 11ᵈ have laterally extending flanges 11ᶠ at their upper ends which lie against the under side of the upper aluminum section of the outer casing of the member 11, or 11ª and these flanges are clamped to the said upper section by nuts 11ᵍ on the bolts 11ʰ, which hold together the upper and lower outer casing sections of the heating element. This inner frame member is therefore suspended from the said top section of the casing of the heating element 11 or 11ª, as the case may be, and it is in spaced apart relation to the side of said casing and also in like relation to the bottom and back of said casing, thus leaving dead air spaces along the bottom back and sides, but no dead air space is left at the top where the heat is to be supplied to heat the upper plate portion 14 or 14ª. This inner frame member suspended within the casing as just described forms the support for the heating coils and their immediate supporting means. This for the upper coil consists of cross bars of sheet metal Figs. 12, 13ᵇ and 13ᶜ, bent to form double walls as at 11ʲ and having tongues 11ᵏ bent to embrace the edges of sheet metal strips 11ᵐ which extend across the inner frame and through openings in the flanges 11ᶠ thereof.

For the lower coil the cross bars 11ⁿ similar to the bars 11ʲ have their alternate tongues clinched through openings in the bottom plate 11ᶜ of the inner frame member, Fig. 13ª.

This inner frame member has secured thereto the electric terminals 18 through which current is supplied to the coils. These terminals which are in the form of strips with doubled back end portions forming spring members to engage the socket contacts on the top plate of the body 1 pass through openings in the bottom of the casing of the heating elements and in order to prevent the escape of heat here, either from the heating element casing or from within the body of the stove where the oven is located, the bottom of the heating element is provided with an extension or circular embossment 11ᵒ surrounding the electric contacts and resting upon the flat surface of the body 1. This not only provides a close fit and a sealing against the escape of heat, but it elevates the major portion of the bottom of the casing of the heating element 11, 11ª above the top plate of the body 1 and provides a dead air space which prevents loss of heat by conduction. This feature is carried out also in connection with the cylindrical heating elements 10 the bottoms of which are provided with ribs to contact with the top of the stove, said ribs surrounding the openings in the top plate at which the electric contacts are located.

The top sections of the casings 11, 11ª are made of aluminum which will quickly transmit the heat to the articles being cooked on top.

Access is gained to the heating units by lifting up the cover member 4 for which purpose the toaster and waffle irons must be removed, leaving, however, the heating units 11, 11ª in place, whereupon any heating unit can be lifted out of place or can be replaced. By simply lifting the heating units out of place the top plate can be cleaned.

The clay member of the heating unit 10 is imperforate so that all the heat is applied directly against the bottom of the vessel.

At the front heating units cooking can be done on the top plates of the casings or jackets 11, 11ª of these elements at the same time waffles are being cooked or while toasting is carried on, it being noted that the same heating coils within the said casings which do the toasting or the cooking also heat the top plates 14, 14ª which extend up through the openings in the cover member 4. The top plate 14ª which serves as a griddle has a rib around its edge as at 23, Fig. 12.

The cover member 4 may be held in its raised position by arms 24 pivoted at 25 to the depending sides 5 of the cover. These arms are provided with hooks 24ª which engage slots or openings in the top plate of the main body 1 by which said cover will be held down.

When, however, the arms are turned on their pivots by grasping and turning the finger pieces 24ᵇ on the outside of the cover and attached to the pivots of the arms, said arms can be manipulated to release the catches or hooks 24ª from engagement with the top plate 1 and the arms can be set in position to support the cover in elevated position, the end portions 24ᶜ of the arms having been brought to bear on the top plate 1.

The front body panel 25 and the back plate 26 of the stove are of sheet metal like the main body and like the cover member 4 and the casings of the heating elements above described and also like said parts they are stamped to shape. The front panel or stamping is provided with an opening to receive the oven 28 within the main body of the stove, the door of which is indicated generally at 27. The back plate, the front panel and the main body 1 are held together by rods 29 and screws 30.

A bead strip 31 is inserted between the meeting edges of the main body 1 and the back plate and also between the main body and the front panel or frame.

The main body is bent or shouldered at 32, Fig. 6ª, leaving a rim portion 32ª and the bead strip has a channelled portion 32ᵇ embracing this rim portion and fitting against the shoulder whence the bead extends outwardly and is rounded or curved at its outer portion 31 to engage the flange 32ᶜ of the adjacent member, back or front panel, the said flange fitting against the channelled portion of the strip. This bead not only provides a finish for the joint or meeting edges of the members and hides any raw edges of the white enamelled parts but also serves to strengthen the joint by reason of the reinforcement afforded against inward displacement.

Each bead member is made in one continuous piece or strip. This strip has its inner flange cut away at 32ˣ, Fig. 6ᶜ, at the point where the strip is carried around the corner of the body. At this point the wall of the body 1 is curved as shown at 1ˣ, Fig. 5, adding strength to the structure as well as to its finished appearance. This bead strip is shaped to the form of an open frame corresponding to the cross sectional shape of the body 1 and in assembling the parts it is slipped onto the edge of the body, then the back or front plate of the body is slipped into its place in the bead and thereafter the tie rods 29 are placed in position, and all parts are drawn together.

Within the main body 1 the oven member 28 is supported in spaced apart relation to the top, bottom, back and sides thereof. This oven member is composed of inner and outer sheet metal walls with a dead air space between them at the top, sides, back and bottom of the oven. There is a ventilator at $d$ in the front door for ventilating the space within the oven.

The rear wall of the oven is formed of spaced apart sheet metal members 28ª, 28ᵇ, Figs. 6 and 6ª, with a dead air space for heat insulation. The back plate 28ª is shouldered at 28ᶜ and flanged at 28ᵈ to bear against the inner side of the main walls of the oven and these joints are welded. The back plate 28ᵇ is flanged at 28ᵉ to embrace the outer wall of the oven, but need not be welded at this point because this back plate is mechanically held as will be described. The oven is insulated against loss of heat both by the dead air space between its walls and also by the dead air space between the oven body and the wall 1 of the main body of the stove.

This feature of insulation by dead air is carried out as above described in connection with the upper burners, both by reason of the casings enclosing the heating elements proper and because of the use of the cover member 4.

The oven is supported at its rear end in spaced apart relation to the back of the main body by two screws or bolts 1ª. This leaves a dead air space for insulation against the escape of heat at the rear of the stove.

The bolts have each a rectangular portion, with a spacer 1ᶜ between the shoulder thereof and the inner side of the back wall 28ᵇ of the oven. Nuts 1ᶠ on bolts 1ª hold back wall 28ᵇ against spacer 1ᶜ and there is a spacer 1ᵈ between nuts 1ᶠ and the hollow nut or thimble, which is threaded on the bolt and forms the connection between it and the rear wall of the body 1.

The oven is supported at its front end in the panel member 25 for which purpose said panel or front member is stamped to provide a seat at 25ª of curved form to receive the rounded surface of the turned bead or edge 28ᶠ on the member 28ᵍ which forms the front end or portion of the oven proper. This bead is formed on a flange projecting from the said member 28ᵍ. This member 28ᵍ is secured to the walls of the oven by its bead 28ᶠ and by a weld at 28ʲ, and it is curved to provide a seat for the door. This door 27 is hinged at its lower edge to the front body panel 25 at 35 and it is composed of a front portion, a panel 27ª, a back 34ª curved to fit the curved seat at the front of the oven, and an intermediate member 34ᵇ. These members of the door are held together by their interlocking flanges at 34 and by male and female screws 34ˣ which connect the door members 27ˣ, 27ª, 34ª, and 34ᵇ, Fig. 6, and make a rigid door structure. These screws are located near the corners of the door structure. The inner heads of these screws are countersunk in recesses formed in the plane or flange portions of the members 34ª, 34ᵇ, where these contact and make a double thickness of material. The part 28ᵍ of the oven and the inner plate 34ª of the door are stamped out in the same die at the same time so that they will fit perfectly where they contact with each other.

A door of the construction described provides two dead air spaces, one on each side of the central plate or member 34ᵇ and these spaces provide heat insulation at these points.

By my construction the insulation of the oven against the loss of heat is carried out to a maximum degree. The features entering into this is the double wall construction of the oven itself, with a dead air space between its walls, also the dead air space between the oven and the wall of the body, and the further dead air space between the top of the body and the cover member 4, which with the dead air space over the top of the oven provides, together with the dead air space between the top walls of the oven itself, a triple dead air space against the loss of heat upwardly from the oven, and at the front the double dead air spaces of the door provide for heat insulation here. The oven is removable and can be drawn out or pushed into place as one body.

When pushed into the main body, it engages inclines on terminal block 51 or skids 36 which raise it to the proper level properly spaced from the bottom of the main body, and also properly positioned to receive hollow nut or thimble for holding the oven in place, and effect alignment of insulator block 49 between rear ends of oven and blocks 50, carried by main body, said blocks 50 supporting contacts whereby current will be supplied to the heating coils with which oven is provided, as will be described. The front portion of the oven may be said to have a self adjusting action. The opening in the panel member 25 and seat $25^A$, being slightly larger than the bead and outer sheet metal wall of oven.

This construction is therefore one in which the front end of the oven while held in position to receive the door within its recess will have a slight floating or accommodating action to make it conform to any slight misalignment with the part of the door which enters its recess and makes a tight joint.

The door when lowered to substantially a horizontal position to gain access to the oven is held in this position by side rods 37, which are pivotally connected to the door by semispherical members 38 fitting in recesses in the door frame, said rods having springs 39 connected to their inner ends and to the rear wall of the main body of the stove by which the door is under stress tending to balance or close it.

Figure 3:
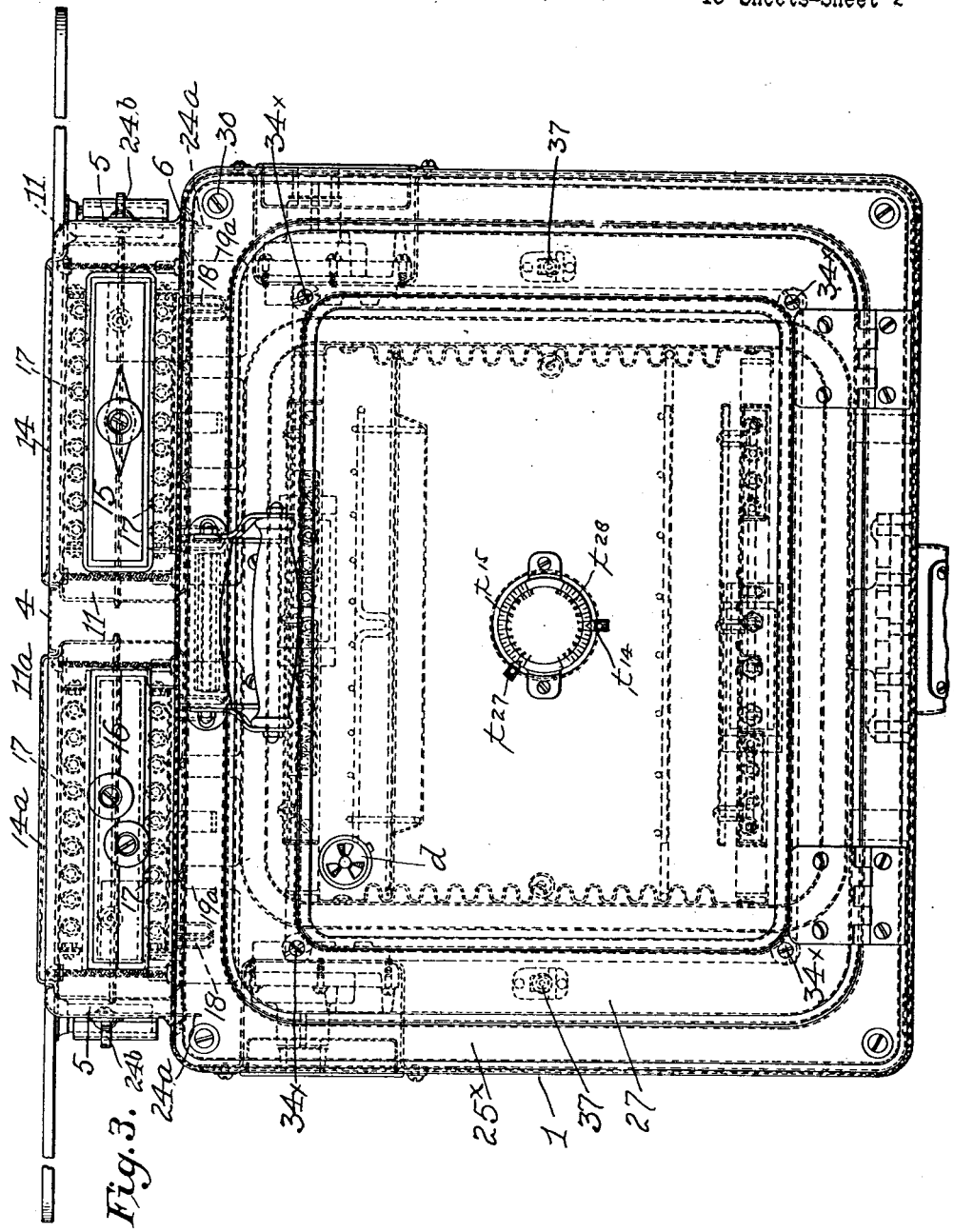
Fig. 3 is a front view.
Figure 4:
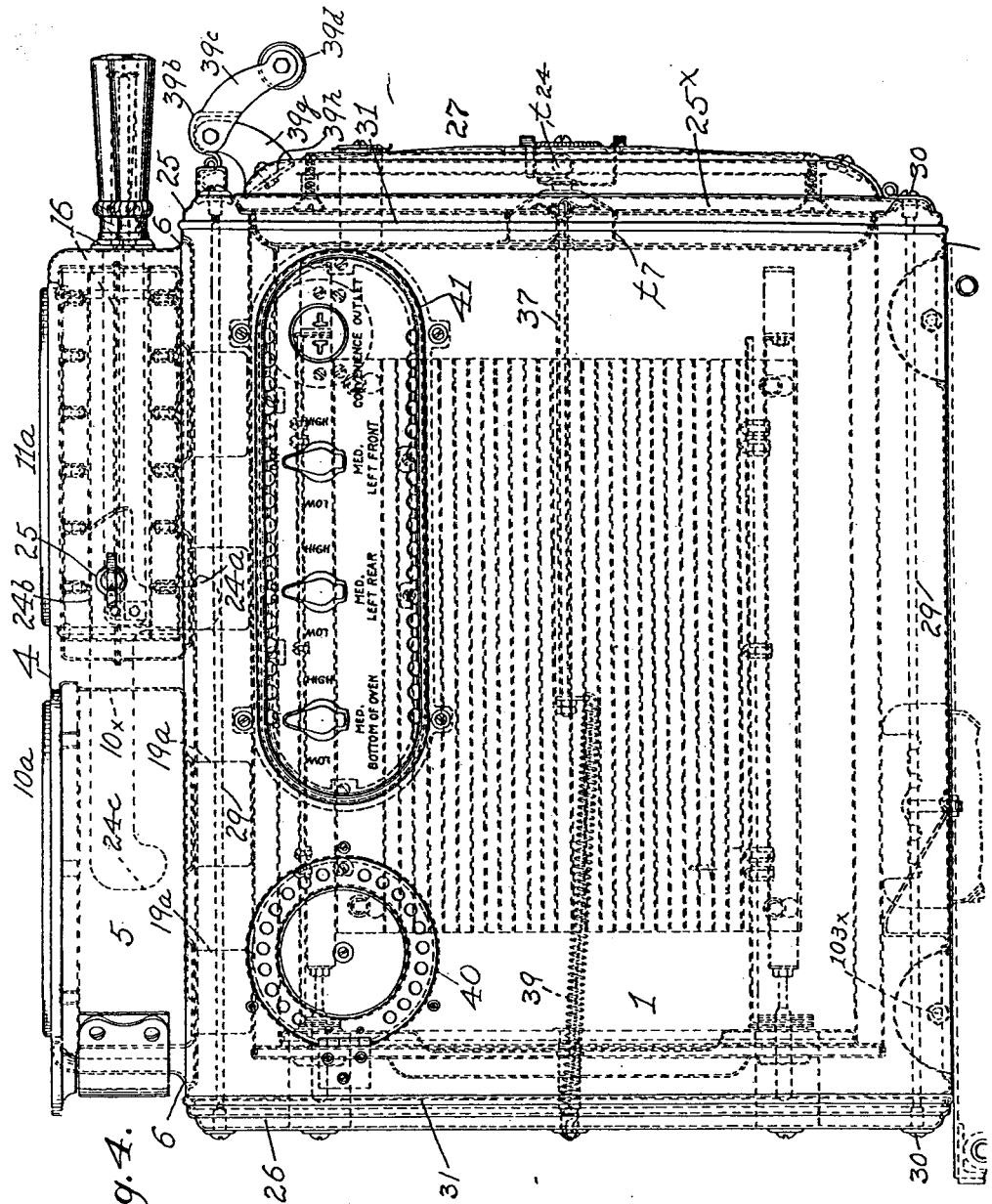
Fig. 4 is a side view looking from the left.

These rods and springs lie in the space between the sides of the oven and the sides of the main body. The position of these rods is indicated in Figs. 3, 4 and 6 in dotted lines and in Fig. $6^a$.

The sockets in which the hemispherical pivots 38 work are formed in the double thickness of metal provided by the contacting flanges of the members $34^a$, $34^b$. There is a clip $38^a$ at each of the hemispherical front pivot bearings 38 of the rods 37 which clip engages the back or square shoulder on the hemispherical members. The lowered or horizontal position of the door is determined by the plate $37^b$ on the rod 37 coming against the inner side of the front wall 25 and acting as a stop. This plate has the spring 39 connected thereto.

In order to take out the oven it is necessary to drop the front door down further than normal horizontal or lowered position, and for this purpose the rods which support the oven door in lowered position are provided with knurled portions $37^a$ by which the rods may be turned and disconnected from the nuts 38 and the door then can be lowered far enough to not obstruct the oven in its removal.

The door is provided with a handle by which it may be manipulated.

This handle as well as its keeper $39^a$ is made of sheet metal stamped up into shape. The handle comprises a cross bar $39^b$ of channel form with arms $39^c$ extending forward. Between the front ends of these the handle proper or grip $39^d$ is secured. The cross bar presents end walls which receive the pivots $39^f$ which are supported by bracket arms or ears $39^g$. These have base portions $39^h$ on the inner side of the front wall of the stove door to which they are screwed, the said arms passing through slots in the front wall.

The cross bar of the handle has an integral extension $39^j$ bent upwardly and then downwardly with a rounded upper portion to engage under a lip $39^k$ stamped from a part of the keeper $39^a$ which is secured to the front member of the stove.

The right and left sides of the main body of the stove are symmetrical relative to each other in that each has a circular recess 40 near its rear upper corner, and along the upper margin of each side there is an elongated recess 41.

In the circular recess at one of the sides there is located a relay electric switch and at the other circular recess there is located a timing device or clock which will control the current supply automatically according to the time it is desired that the oven heating elements are to be put in operation and the time they are to be put out. The clock or timing mechanism may be placed in either of the recesses and the switch in the other and the stove is thus capable of being used as a right hand or as a left hand stove in the sense that the clock may be placed either at the right or left to suit the position that the stove must assume in relation to the room in which it is placed.

In other words the clock or timer and the relay switch are interchangeable in position.

Referring to the cross sectional view Fig. 5:

The oven is provided with upper and lower heaters 42, 43. Also side racks 44 for receiving the cooking utensils at different heights. The heaters may be of the form shown in Figs. 8, 9, 10 and 11, consisting of frames 45 on which are mounted channel bars in which are held insulators 47 through which the resistance coils 48 are threaded. These heating coils are arranged in two sets, one set is located between the terminal contacts $a$, $b$, and the other set is located between the terminals $c$, $b$. The first set includes the groups of turns of the coil $a^1$, $a^2$, $a^3$, $a^4$, the groups $a^1$ and $a^2$ being connected by the straight portion or continuation of the coil as shown at $a^5$, the groups $a^2$, $a^3$ being connected by the transverse strand of the coils at $a^6$. The groups $a^3$ and $a^4$ are connected by continuing the coil at the straight strand $a^7$. The portion of the heating element just described provides a heater with its coil portions widely distributed.

The other portion of the heating coil connected between the terminals includes the groups of turns of the coil at $c^1$, $c^2$, $c^3$, $c^4$ connected in the order named.

The three terminals $a$, $b$, $c$ project rearwardly from the heating element as shown in Fig. 8 and as in Fig. 6 they pass through an insulating block 49 fixed between the walls of the rear members or back of the oven. These terminals are guided through this insulating block and they engage spring terminals carried by insulating blocks 50 fixed to the rear wall of the main body.

In removing the oven from the main body for cleaning, repair, or replacement, the burners are first removed and the contacts $a$, $b$, $c$ leave their companion contacts and when the oven or the heater is pushed back into place and the heating element replaced the said contacts $a$, $b$, $c$, pass into position in engagement with their companion contacts and no coupling up act is necessary to establish the proper circuit connection at this point, other than pushing the heating element back into place. In order to prevent any steam or moisture from passing out from the oven at the openings in the insulating block 49, I provide a pad $49^a$ of asbestos backed by a block of fibre $49^b$ mounted on the terminals $a$, $b$, $c$ against the shoulders $d$ thereof, which pad closes over the said openings and prevents the escape of moisture.

A main terminal block is shown at 51 to which the outside leads are connected and from which the connections of the stove installation lead.

This installation is shown diagrammatically in Fig. 7 which represents the back, top and right and left sides and bottom of the main body. The view of the back is of the inner side, that of the top is a bottom view, and the inner side of the right and left sides. The bottom is shown in plan. The door is also shown in this diagram in plan view.

The rear upper open burners 10 are composed as above stated of a coil in spiral form seated in a groove of an insulating clay block. These burners can supply three different heating effects. One heating effect is secured when only one portion of the coil is in operation, another i. e. a greater heating effect is received when two sections are connected in multiple arc, and when the two sections are in series a lower heating effect is obtained. When only one section is in use it is the one at the center of the heater so that a small heating area is presented to heat a small vessel or to concentrate the heat at the center of a large vessel.

Each heating element at the top of the stove is provided with three of the depending contacts 18. In the diagram Fig. 7 the blocks $19^a$ are shown in sets of three which have the sockets with spring contacts therein with which the contacts 18 of the burners engage, that is, there is a set of three of these socket blocks for each of the top burners. One of these socket blocks is shown in Fig. $5^a$ in which the block is marked $19^a$ and the spring contacts at 19. The burners or heating units i. e. the entire member 10, for instance have their depending contacts 18 and their companion blocks $19^a$ positioned so as to permit only of the proper electrical engagement.

The heating element 11 at the right of the front portion of the stove top is adapted to toast on both sides of the material being toasted, at once, and it also heats the griddle $14^a$ at the same time.

The current may be sent through the upper coil alone or through both the upper and lower coils in parallel to get a quick heat, or through these two coils in series to get a low heat.

The time of starting cooking in the oven can be determined by the clock as well as time of stopping the cooking. The heat is controlled by the gauge set in the front hinged door and the connections leading to and from this thermostat extend through the hollow rods 37 which support the door when lowered. This control part of the apparatus includes a thermostat and time control mechanism connected in the same circuit with the actuating magnet coil of a relay switch shown generally at RS. Closing of the control circuit which is connected to the main feed lines energizes the magnet coil, closing the relay switch and completing the circuit carrying the main current to the oven elements. This relay switch like the time control is mounted within a casing extending into the main body of the stove. This casing is closed by a hinged cover $rs$ which is perforated so that the temperature within the casing will be like that of the room.

There is a space as above stated between the oven and the wall of the main body both at the top, sides and rear portion of the oven, and all of the circuit wires are located in this space, where they are concealed from view, safe guarded from injury and easily accessible when the oven is removed.

*Thermostat.*

The thermostat for controlling the temperature of the oven is mounted in the hinged front door.

Openings are provided through the three plates or members of the front door to receive the thermostat mechanism. In the opening in the back sheet metal plate 34ª Fig. 15, a cup shaped shell $t$ is mounted by the contacting flanges thereof engaging the flange $t^3$ of the door member, screws $t^1$ holding the shell in place. The open side of this cup member communicates with the oven space and consequently is exposed to the oven temperature. Within this cup shaped member is located the thermostat coil $t^2$, the outer end of this coil being attached to the wall of this cup shaped shell for which purpose the shell has an inwardly extending lug $t^x$ struck in therefrom which is engaged by the end of the coil, which is slotted at $t^4$ to receive the lug.

The inner end of the coil extends diametrically thereof and through a slot $t^{19}$ in the center shaft $t^6$ where it is held by a screw $t^{20}$ threaded into the shaft coaxially therewith and engaging a notch $t^{21}$ in the edge of the strip of metal forming the coil. The coil encircles a sheet metal cup shaped shell $t^5$ which is held to the shaft by the same screw $t^{20}$ which serves to hold the inner end of the coil to the center shaft. This shell is slotted at $t''$ for the passage of the coil. It is provided with projections $t^{23}$ which enter the slot $t^{19}$ of the shaft and hold it against circumferential displacement relative to the shaft. This shaft $t^6$ has a bearing in the shell $t$ and in a sheet metal shell $t^7$ which is flanged and is secured to the plate or member 34ª of the front door by a spacer $t^8$ extending between the walls 34ª and 34ᵇ of the door.

A screw $t^9$ extends through the spacer and is threaded into a screw $t^{10}$, the head of which bears on the outer side of the front wall or member of the door structure. Threaded on the screw $t^9$ are nuts $t^{11}$, one of which bears on the outer face of the intermediate plate 34ᵇ of the door. Between these nuts the insulated electric terminal $t^{12}$ of the thermostat is clamped. This construction $t^8$, $t^9$, etc. is duplicated at the other side of the thermostat organization. The shell $t^7$ closes the flanged opening in the intermediate member or plate 34ᵇ of the door structure and there is a dead air space between this shell and the cup $t$ in which latter the thermostat coil is located so that thermal insulation is secured at this point insuring that the thermostat coil will be subjected only to the temperature within the oven. The shaft $t^6$ is shouldered at its outer end and on the reduced end thus provided is mounted a holder $t^{13}$ for the mercury tube $t^{24}$ which has within it the electric contacts which are closed and opened by the mercury according to whether the position of the tube is such as to immerse the contacts or to flow the mercury away therefrom.

This mercury tube holder is mounted frictionally on the shaft by a screw $t^{18}$ and spring washer $t^{17}$ so that the holder can be turned about the shaft for adjustment and at the same time the holder will remain frictionally attached in any position to which it may be set so as to partake of the movement of the shaft due to the expansion or contraction of the coil, it being understood that as the coil has its outer end fixed to the stationary shell $t$ at $t^x$ expansion or contraction of the coil under variations in temperature of the oven will cause the inner end of the coil to rotate the shaft $t^6$ in one direction or the other according as the temperature rises or falls. The tube holder has an arm $t^{26}$ with a pointer $t^{27}$ thereon to move over a scale $t^{15}$. This scale is marked on a stamped sheet metal shell provided with ears $t^{16}$ overlying and screwed to the outer surface of the front wall of the door.

There is a space or slot between the edge of the scale member and the edge of the door plate as shown at $t^{25}$ and the arm $t^{26}$ extends out through this slot or space, where it is accessible for setting by the cook.

Fixed to the shaft $t^6$ there is an indicator arm $t^{14}$. This has an opening to fit the reduced end of the shaft with projections $t^{27}$ to fit a curf in this reduced shaft end wherein the projections are held because the hub portion of this arm underlies the hub portion of the tube holder which as above stated is frictionally held by the spring washer and screw.

This indicator arm works over a scale $t^{28}$ marked on the same plate with the scale $t^{15}$, but in the opposite direction.

The contact points carried within the mercury tube are shown at $t^{29}$ and electrical connection is made to these points from the terminals $t^{12}$ above described.

In setting the thermostat for any desired temperature the indicator pointer is held or moved to the scale mark 1 on its scale $t^{28}$ and while it is held in this position the pointer $t^{27}$ of the mercury tube holder is moved on its scale $t^{15}$ to the point or scale mark indicating the temperature desired. This latter action of course will set the holder in relation to the shaft $t^6$ and the indicator pointer. Then release the indicator pointer and allow the instrument to assume its position according as the temperature of the coil will call for at this moment. Now when the indicator hand under a rise in temperature reaches the mark on its scale corresponding to the mark at which the pointer of the mercury tube holder was initially set in making the setting or adjustment, the mercury tube will have reached a position at which it will be so inclined that the mercury will flow away from the contact points leaving them bare and thus the current to the actuating coil of the relay switch will be broken and the current to the heating elements will be cut off and remain so until the temperature within the oven falls below that for which the instrument is set, whereupon the contraction of the coil will turn the shaft $t^6$ the other way and by carrying the mercury tube holder along with it the latter will be inclined the other way so that the mercury will flow to the end of the tube at which the electrical contacts are located, causing their immersion and electrical connection and the current will therefor be supplied again to the heating elements.

The various shells above described, the tube holder, the indicator arm, the spring washer, and the terminals $t^{12}$ are all of stamped sheet metal. The tube holder has besides its arm $t^6$ and the hub portion, a pair of arms $t^{20}$ which have sufficient spring action to grip the tube and hold it in place.

The general construction of the thermostat organization lends itself to association with the construction of the door above described, and the feature relating to heat insulation is carried out in connection with this thermostat organization.

*Time control.*

The time control includes a clock of any standard form, the casing 66 of which is hinged at 67 to be moved into and out of one of the recesses in the main body of the stove. This recess is formed by a casing or shell 68 Fig. 5 attached to the stove body and projecting into the interior thereof in the space between one of the side walls and the oven. The flange of casing 66 is perforated at 66ˣ to keep the temperature within casing 68 at or near room temperature. The control of the circuit which operates the oven heaters is exerted by a tipping mercury tube 69 which has contacts therein operating in connection with the shifting body of mercury in a manner similar to that above set forth. The holder for this mercury tube is a sheet metal member stamped to provide spring fingers 70 for grasping the tube, a base portion 71 having an opening by which said member is pivotally mounted on a stud 72 screwed to the depending part 73 of the supplemental casing 74 which carries the binding posts 75, 75ª of the circuit wires from which binding posts electric connection is made through wires 76 with the contacts extending into the mercury tube. This supplemental casing is secured by screws 77 to the upper side of the clock casing which has an opening to receive said supplemental casing and its depending bracket portion. The bracket or holder 70—71 for the mercury tube has movement on the said stud under frictional restraint of a friction washer 78 which is arranged between the head of the screw stud 79 and the part 71 of the holder, said screw being threaded into the depending part 73 of the supplemental casing 74.

The tube holder has a stud 80 projecting from its rear side through an opening in the part 73 of the supplemental casing or bracket and $a^1$ so through an opening in the back of the main casing, and this stud has inclined upper and lower inclined sides converging to a narrow edge adapted to be contacted by "on" and "off" projections 81, 82 on arms 83, 84, respectively having perforated hub portions mounted to turn on a hollow sleeve or stud 85 which fits on a stud 86 projecting from the clock mechanism through an opening in the rear wall of the casing thereof. The sleeve is held on this stud by a screw 88. The sleeve at its end has a gear wheel 89 to mesh with a gear of the clock works by which the sleeve is driven. The sleeve carries fixed thereto a dial 90, the edge of which is ratchet toothed to receive spring pawls 91—92 on the "on" and "off" arms 81, 82.

This dial plate is curved to economize space and enable it to clear the edge of the opening or recess in the main body of the casing as the clock mechanism is swung to and from place within the recess. In setting this controller the "on" arm is set at the mark on the dial 90 corresponding to the time at which cooking is to start and the "off" hand or arm is set at the time mark at which the current is to be turned off to stop cooking, it being understood that the dial is provided with hour marks corresponding to the clock face and with subdivision marks of these hours, say 12 subdivisions for each hour and the ratchet teeth correspond to these subdivisions. The dial 90 rotates with the hour hand and the current will be automatically turned on when the projection of the "on" arm tips the mercury holder by coming against the projection 80 of the mercury tube holder and tips the mercury tube to a position in which the mercury will immerse the electric contacts thereof and cooking will continue until the dial plate 90 has rotated to the point where the projection on the "off" arm will work against the projection 80 of the mercury tube holder and tips the tube to a position where the mercury will leave the contacts and break the circuit at this point. The dial 90 together with the indicator arms, the sleeve and gear for connecting with the clock works constitute a unit removable and replaceable as such.

When the time control is not desired the mercury tube can be short circuited by a switch lever 91ˣ pivoted on the stud of one of the terminals, i. e. 75 in the supplemental casing and adapted when thrown to one position to engage the other terminal 75ª and thus cut out electric connection with the contacts of the mercury tube, and therefore the stove may be used either with or without the time control, by swinging this switch lever so as to break electrical contact with terminal 75ª or to make said contact. This switch with its terminals the mercury switch and supplemental casing constitutes a unit which can be removed from or replaced on the main casing of the time control, see Fig. 23.

The feature of the heat insulation is carried out in connection with the time control mechanism, for which purpose the inner casing or shell 68 is provided attached to the side of the main body.

Within this casing are located binding posts 92 for the electrical connections.

The switches at the sides of the body which control the heating elements for "low", medium or high heat or "off" condition, are arranged in a casing or shell 68ª. This is formed of stamped metal and it is secured by screws to the body of the stove. The switches are arranged on insulating blocks and these blocks are located within said casing, but extending through the bottom thereof in respect to the interior space of the stove. Fuses are located in this casing, and a convenience outlet X is also employed.

The front of this receptacle is closed by a plate 68ᵇ having ventilating openings 68ᶜ for the purpose of keeping the temperature inside the casing 68ª as nearly at room temperature as is possible.

At the rear corners of the stove cover 4 platforms 4ª are provided to give additional space for cooking utensils not in immediate use or when the cooking operation has been completed. These platforms may be turned horizontally to overlie the cover member or they may be removed by lifting them from their pivot bearings. To turn them over the top of the cover member 4 they are first lifted slightly from normal position.

The stove is specially adapted to be mounted on brackets or a bracket frame 93 which is to be secured to the wall and the stove is thus elevated from the floor and has the space beneath it entirely free.

This bracket frame is composed of arms 94 made of one piece of flat sheet metal with side portion 95 curved backwardly and downwardly, preferably perforated, and having the top and rear edges flanged inwardly at right angles to said side portions. The pair of side bracket arms are connected at the rear by a cross-bar of angle iron 97, the ends of the horizontal flange of which fit under the horizontal flanges of the arms 94 and its vertical flange rests against the front side of the vertical flanges of the arms 94. In other words, the angle iron cross-bar 97 fits in the rear upper corners where the flanges of bracket arms 94 join each other.

The side bracket arms are held together by three tie rods 99 passing through spacer tubes 98. On the rear tie rod, at each end, there is a washer 100 bearing on the inner side of the flanges of cross-bar 97 and holding cross-bar in place.

On this rear cross bar there are clips 102 which embrace the forward edge of the horizontal flange of said cross bar and have upwardly extending portions adapted to be screwed to the studding of the wall of the kitchen.

These clips are free to be moved along the rear cross bar to suit the position of the studding. If the stove is to be supported from a brick wall, expansion bolts may be used. The horizontal arms of the brackets are provided with upwardly extending bosses 103 which are to fit up into the recesses formed in the bottom of the stove.

Referring to Figs. 28 to 31 I show a mounting for the stove by which it may be enclosed in a recess in the wall of the kitchen. This recess is indicated at 52 and is to be closed by a door 53 hinged to the lower edge of the recess at 54, the hinge being between the door member and the sheet metal frame member 55, which extends around the margin of the recess 52 and is suitably secured by screws to the wall of the kitchen. The door 53 of the recess 52 when lowered provides a platform upon which the stove may be drawn out for use and this door or platform is held in its lowered position by side bars 56 slotted longitudinally and engaging guides or studs 57 which are secured or riveted to a flange 58 of the frame 55. The bars 56 slide on these studs and the studs limit the movement of the bars by the end wall of the slot of the bar coming against the stud as shown in Fig. 28 when the door 53 has attained its horizontal position. The door may be provided with suitable tracks as at 59 to receive the rollers 60 mounted in casings which fit in recesses formed in the bottom of the stove body, so that the stove may be drawn out from the recess 52 with little effort and may be pushed back into said recess very readily.

The lower ends of the slotted bars 56 are pivotally mounted on the cross bar 61. This bar is hollow and is held at its ends by screw as 62 to the door frame, which frame may be made of a stamped front plate 63 and a stamped inner plate or back 64 which are held together by screws 65 as shown in plan view Fig. 31. This figure represents a sectional view on line 31, 31.

By mounting the stove on brackets extending from the wall as shown in Figs. 1 and 2 the space beneath is left entirely clear.

When the stove is mounted on brackets the bosses 103 project up through openings in the bottom of the stove. These openings have their edges turned upwardly slightly, The bosses 103 may be in the form of sheet metal shells welded to the bracket. Bolts 103ˣ passing through the bosses and resting on the flanged edges of the openings and within the body hold the stove body to the brackets.

When the stove is to be mounted as shown in Fig. 28 the casings 103ᵃ of the rollers will be secured to the body of the stove at the openings in the bottom. I do not limit myself to any particular form of support for the stove.

Certain features disclosed herein are claimed in co-pending applications filed Aug. 30, 1926, No. 132,543; Feb. 3, 1927, No. 165,676; March 24, 1927, No. 177,987; Feb. 13, 1928, No. 255,423; and in Letters Patent of the United States No. 1,663,151, March 20, 1928.

I claim:

1. In combination in an electric stove, a main body having a top plate and an electric heating unit surmounting said top plate and removably supported thereby, and a cover member also surmounting said top plate and having itself a top plate and depending sides enclosing said electric heating unit, said cover member having an opening in its top registering with said heating unit, and hinged at its rear end to the main body of the stove to be raised for exposing the heating unit and top plate, substantially as described.

2. In combination in an electric stove, a main body having a top plate, an electric heating element surmounting the same and having a top plate carried thereby, and a cover member movably mounted on the top plate of the main body and provided with an opening registering with the top plate of the heating element and through which opening the top plate of the heating element is exposed, substantially as described.

3. In an electric cooking stove of the type having an oven below its top plate, the combination therewith of a heating unit surmounting said top plate to supply heat upwardly for cooking, said unit having a laterally open space for receiving removably a cooking utensil within it and electric heating means in the unit, substantially as described.

4. A heating unit for electric stoves comprising a casing having a laterally open space within it for receiving a cooking utensil, heating means within the casing to heat said space and to supply heat at the top of the unit, said unit carrying electric contacts adapted to removably engage contacts on the top plate of the stove for supplying current to the heating means of said unit, substantially as described.

5. An electric stove comprising a main body with a top plate, a heating unit surmounting the top plate, a movable cover member supported on the top plate, and enclosing the heating unit, said cover member having an opening, through which the heating unit is exposed for cooking, said heating unit comprising a casing with heating means therein and with a side opening through which a cooking utensil can be inserted or removed, the said cover member having an opening in its side registering with the side opening of the heating unit for the insertion or removal of said cooking utensil, substantially as described.

6. In combination in an electric stove, a sheet metal body having its top plate countersunk, an electric heating unit removably seated on the countersunk portion of the top plate, and a cover member hinged to the top plate and having its edge portion fitting the shoulders of the main body bounding the countersunk portion of the top plate, said cover member having a top plate and depending sides for enclosing the space occupied by the heating unit and having an opening in its top through which the heating unit is exposed, substantially as described.

7. In combination in an electric stove, a body having a top plate with electric contact sockets therein, a removable heating unit removably seated in said top plate and having contacts to engage the sockets of the top plate, said unit comprising a casing, a shell therein spaced apart from said casing at its sides, bottom and back for heat insulation, heating coils within said shell, and a cover member having an opening in its top through which the top of the heating unit is exposed, said cover resting movably on the top of the stove with a dead air space between it and the casing of the heating unit, whereby the heat is conserved by the two dead air spaces, one within and the other surrounding the casing of the heating unit, substantially as described.

8. A heating unit for electric stoves to be removably mounted on the top thereof and comprising a casing and a shell or frame suspended within the same with a dead air space between it and the casing at its sides, back and bottom, a heating coil carried by said shell or frame in two sections, one at the top and one at the bottom of said shell, said shell having a guide way and rest intermediate of its height for receiving a cooking utensil, heat of the upper coil, said casing having contacts to removably engage electric contacts on the top of the stove, substantially as described.

9. An electric heating unit to removably engage the top of an electric stove, said unit consisting of a casing, a shell, or frame mounted therein, spaced apart therefrom at the sides, bottom and back, said frame being flanged at its upper part and resting against the under side of the top of the casing, said casing being composed of upper and lower sections, bolts holding said sections together, nuts on the bolts holding the flanges against the under side of the top of the casing, strips extending across the top of the shell or frame, and entering openings in the shell, bars attached to said strips by clips or foot portions, lower bars attached to the frame, insulators carried by said bars and heating coils supported by said insulators, substantially as described.

10. In combination in an electric stove, a heating unit comprising a casing made in upper and lower sections, a shell or frame within the casing spaced apart therefrom, providing a dead air space between said shell and casing, bolts securing the sections of the shell together and for securing the shell to the upper section, and heating coils mounted on the shell or frame, substantially as described.

11. In an electric stove, a body having an oven member within it spaced apart therefrom, at top, sides, bottom and back, electric heating coils within the oven, an electric heating unit surmounting the top plate of the stove and a movable cover for the top of the stove enclosing the heating unit to provide a dead air space thereabout, said dead air space together with the dead air space between the stove top and the oven top serving to prevent loss of heat upwardly, from said oven substantially as described.

12. In combination with a stove body, having electric contacts in its top, a heating unit mounted on said top and having contacts to engage those of the top, said unit comprising a casing of rectangular form having a recess to receive a cooking utensil, said casing having an upper extension of circular form, and a movable cover member having an opening through which said circular portion is exposed, said circular portion forming the closed top of said unit, and a closure for said opening, substantially as described.

13. In combination in an electric stove, having a main body, a heating unit surmounting the body and supported removably thereon, said heating unit comprising a casing and heating means, electric contacts carried by said casing and said stove body for electrifying said heating means, and a cover member movably mounted on the stove body and enclosing the heating unit to form a dead air space about the same, said cover having an opening into which the top of the heating unit extends to form a closure therefor and to present its upper surface for cooking, substantially as described.

14. A heating unit for electric stoves comprising a casing composed of upper and lower sections, a frame suspended within the casing having a guide way and rest intermediate of its height for receiving a cooking utensil, electric heating means above and below said guide way, means for holding the sections of the casing together and electric contacts at the bottom of the casing to removably engage contacts on the stove, substantially as described.

15. In combination with a stove body, having electric contacts in its top, a heating unit mounted on said top and having contacts to engage those of the top, said unit comprising a casing of rectangular form having a recess to receive a cooking utensil, said casing having an upper extension of circular form, and a movable cover member having an opening through which said circular portion is exposed.

In testimony whereof, I affix my signature.

CHARLES C. ARMSTRONG.